United States Patent [19]

Jaenichen, Sr.

[11] Patent Number: 4,872,309
[45] Date of Patent: Oct. 10, 1989

[54] PHASE CONTROL MECHANISM FOR WAVE ENERGY CONVERSION

[75] Inventor: Paul N. Jaenichen, Sr., Newport News, Va.

[73] Assignee: The The United States of Americas as represented by the Secretary of the Navy, Washington, D.C.

[21] Appl. No.: 280,869

[22] Filed: Dec. 7, 1988

[51] Int. Cl.$^4$ ............................................ F03B 13/14
[52] U.S. Cl. ........................................ 60/497; 290/53
[58] Field of Search .................... 60/497, 498, 501; 417/331, 333; 290/42, 53

[56] References Cited

U.S. PATENT DOCUMENTS

| | | | |
|---|---|---|---|
| 3,668,412 | 6/1972 | Vrana et al. | 290/53 |
| 3,894,241 | 7/1975 | Kaplan | 290/53 X |
| 3,930,168 | 12/1975 | Tornabene | 290/42 |
| 3,959,663 | 5/1976 | Rusby | 290/53 |
| 4,599,858 | 7/1986 | LaStella | 60/497 |

OTHER PUBLICATIONS

Power from Sea Waves, Edited by B. Count, Academic Press London/New York 1980, pp. 381–399

*Primary Examiner*—Stephen F. Husar
*Attorney, Agent, or Firm*—Luther A. Marsh; John H. Stowe

[57] ABSTRACT

A phase control mechanism for a wave energy conversion apparatus is provided by means of a cam brake locking mechanism. Frictionally contacting locking cams retain a reciprocable drive shaft alternately in upper lower positions with minimal expenditure of electrical power. When the wave crests and troughs have reached predetermined levels, the cams are released allowing the drive shaft of the mechanism to translate to the opposite position.

7 Claims, 3 Drawing Sheets

PHASE CONTROL MECHANISM FOR WAVE ENERGY CONVERSION

BACKGROUND OF THE INVENTION

1. Field of the Invention

This invention relates to the field of wave-action energy-harnessing apparatus and more particularly to a phase control mechanism for a wave energy apparatus utilizing a float reciprocable upwardly and downwardly responsive to the maximum differences between wave crests and troughs.

2. Background Information

The present invention is an improvement on sea wave energy conversion apparatus of the kind described in U.S. Pat. Nos. 3,930,168 and 4,599,858. In devices of this type, wave energy is converted into another form such as electrical energy or is directly harnessed to perform a particular task such as pumping a liquid. Typically, a buoyant body is operative between an upper position and a lower position in a platform which is relatively stationary with respect to the motion of the waves containing the energy to be harnessed. As the floating body is lifted from a lower position to an upper position by the passing of the wave, energy is absorbed from the wave. Then, as the wave passes, the body is allowed to fall into the trough and the potential energy which has been absorbed by the floating body is transformed into kinetic energy. Further, as discussed in Count, Power from Sea Waves, Academic Press, New York, 1980, maximum power absorption in regular waves occurs at resonance. In Count, it was reported that any method of establishing a relationship wherein force and velocity are in phase is equally as good as resonance in obtaining maximum power absorption. In Count, a magnetic locking mechanism for the floating body was established. An analog circuit which could automatically determine the position of the floating body at zero velocity was made and a signal from a wave close to the position of the floating body was fed into a computer. The computer gave out a trigger signal that released the floating body at a time such that the maximum velocity of the floating body occurred at the moment of local peaks and troughs.

One form of wave energy conversion device is disclosed in U.S. Pat. No. 4,599,858 to La Stella and Tornabene. In that invention, a reciprocating shaft is gear coupled to a horizontal shaft and a braking mechanism is applied to a disk affixed to a horizontal shaft in order to retain the mechanism at an optimum point to be released at the passing of the next appropriate wave.

SUMMARY OF THE INVENTION

The present invention is a control mechanism for a wave energy conversion apparatus of the type having a drive shaft reciprocable by means of a buoyant body. The control is provided by means of a cam brake locking mechanism. A supporting bracket is affixedly mounted on the sea wave conversion apparatus said bracket adjacent to the reciprocable drive shaft. A locking cam having a shaft engaging surface suitable for frictionally contacting said reciprocable drive shaft is pivotally mounted on the supporting bracket and oriented to contact the reciprocable drive shaft with the shaft engaging surface. A spring return urges the shaft engaging surface into frictional contact with the reciprocable drive shaft preventing relative motion of the reciprocable drive shaft until a predetermined time. An electrical solenoid pivotally linked with the locking cam such that when the electrical solenoid is energized, the locking cam is disengaged from frictional contact with the reciprocable drive shaft allowing the drive shaft to freely move within said sea wave energy conversion apparatus.

An object of the invention is to provide an improved wave power harnessing apparatus.

Another object of the invention is to provide a mechanism for locking the reciprocating mechanism of a wave-power harnessing apparatus.

Yet another object of the invention is to provide a locking mechanism for a wave-power harnessing apparatus that can be quickly released.

Still another object of the invention is to provide a locking mechanism for the reciprocating mechanism of a wave-power harnessing apparatus that requires power input for release only during the translation of the floating body and not for retention of the floating body at either the upper or lower level.

Other objects of the invention will be readily apparent in view of the following detailed description and appended drawings wherein:

BRIEF DESCRIPTION OF THE DRAWINGS

In the drawings, to which reference will be made in the specification, similar reference characters have been employed to designate corresponding parts throughout the several views.

DETAILED DESCRIPTION OF THE INVENTION

Figure 1:
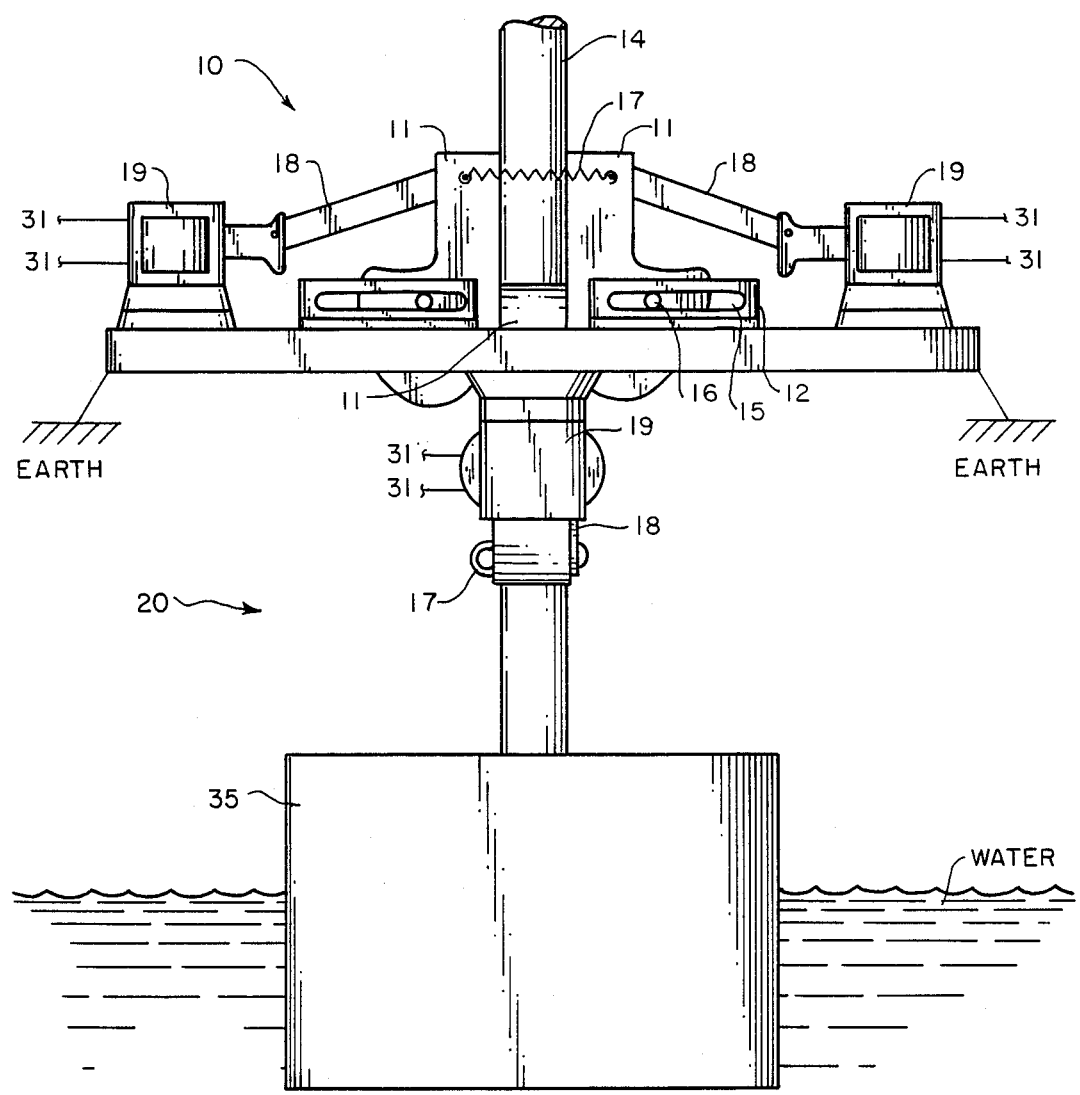
FIG. 1 illustrates a side view of the preferred embodiment of the present invention showing upper and lower pairs of cams lockingly engaging the reciprocable drive shaft of a wave energy harnessing device.
Figure 3:
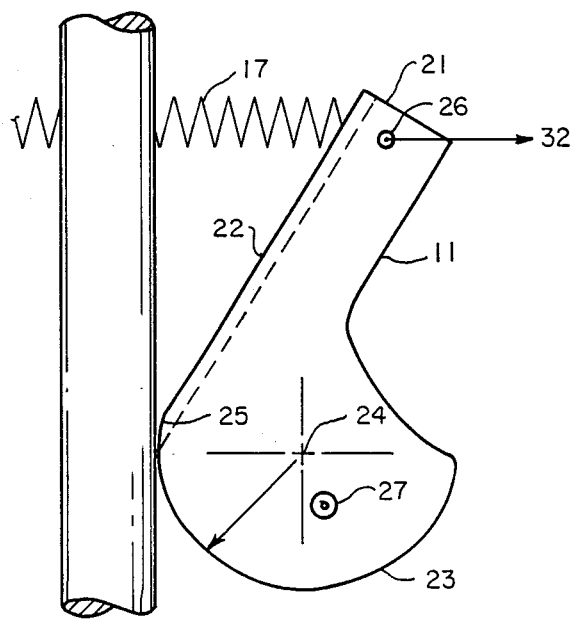
FIG. 3 is a schematic illustration of one locking cam shown in the open or unlocked position illustrating particular cam geometry.

In greater detail, FIG. 1 illustrates the preferred embodiment of a cam brake locking mechanism for a wave energy harnessing device illustrated generally as 10. The cam brake locking mechanism 10 comprises a plurality of locking cams 11 each said cam pivotally mounted between a pair of supporting brackets 12, supporting brackets 12 being affixedly mounted to supporting plate 13. The cams 11 are preferably arranged in pairs, oppositely disposed from each other adjacent to the reciprocable drive shaft 14 of a wave energy harnessing device. The pairs of locking cams 11 are further disposed in an upper pair and a lower pair, the lower pair being preferably symmetrically opposite from the upper pair with respect to supporting plate 13 and said lower pair being rotated 90 degrees from the upper pair, the axis of rotation being the centerline of drive shaft 14. Supporting bracket 12 has a slot 15 for receiving cam pivot means 16, slot 15 in supporting bracket 12 being for convenience of adjustment to optimize the operation of the cam locking mechanism 10. Return spring 17 is affixedly mounted between each opposity disposed pair of locking cams 11 in a manner to urge locking cams 11 into frictional contact with reciprocable drive shaft 14. Pull arm 18 is pivotally mounted between each locking cam 11 and an electrical solenoid 19. When each electrical solenoid 19 is energized, the solenoid pulling force is applied to locking cam 11 causing locking cam 11 to pivot away from a position of frictional contact with reciprocable drive shaft 14 as illustrated in FIG. 3, freeing reciprocable drive shaft 14. The position of locking cam 11 shown in FIG. 3 is schematically representative of each of locking cams 11 when in the open position.

Figure 4:
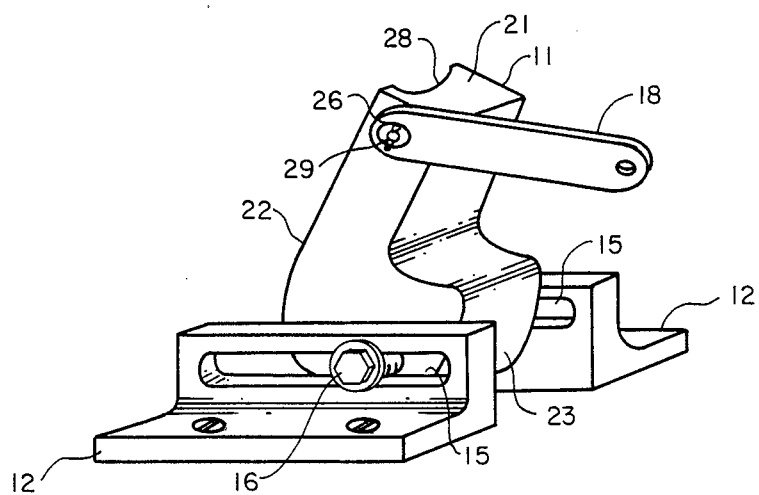
FIG. 4 is a perspective view showing one of the locking cams.

Referring now to FIGS. 3 and 4 the preferred construction of locking cam 11 is illustrated. Locking cam 11 has an end 21 orthogonally disposed with respect to a shaft engaging side 22. Shaft engaging side 22 non-tangentially transitions into a circular portion 23 at transition point 25. Locking cam 11 has an arm pivot pin 26 for receiving the pivotal bore 29 of pull arm 18. The arm pivot pin 26 is located near the locking cam end 21. The circular portion 23 has a cam pivot bore 27 for receiving cam pivot means 16. The centerline of cam pivot bore 27 is offset from the center 24 of circular portion 23 in a direction such that the distance of the centerline of cam pivot bore 27 from the outermost plane of shaft engaging side 22 is greater than the radius of circular portion 23 and the distance of the centerline of cam pivot bore 27 from the end 21 of the cam is greater than the distance of the center 24 of circular portion 23 from the end 21 of the cam. Preferably, locking cam 11 has a shaft engaging surface 28 substantially conforming in shape with the outer surface of reciprocable drive shaft 14. The friction between shaft engaging surface 28 and reciprocable drive shaft 14 may be enhanced by any suitable means such as grooving surface 28 and applying a Room Temperature Vulcanizing (RTV) silicone rubber compound to the shaft engaging surface.

Figure 2:
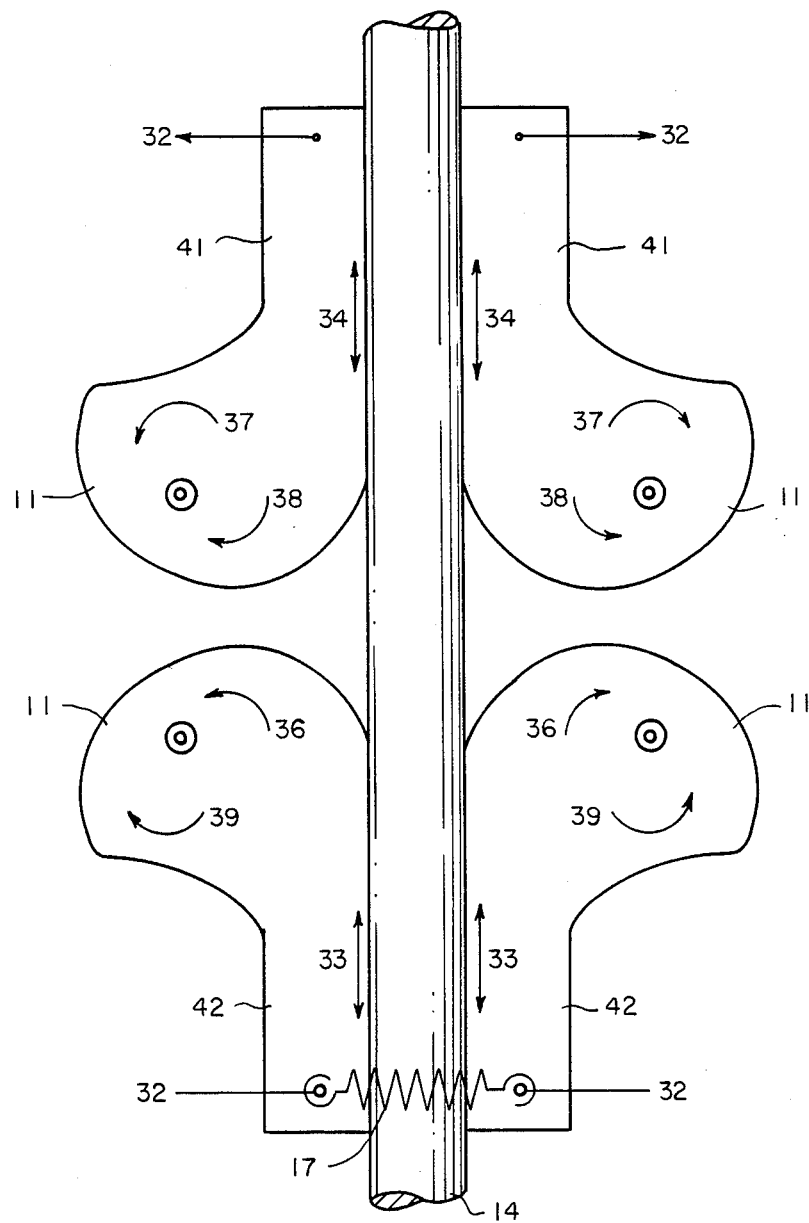
FIG. 2 is a schematic illustration similar of the cam brake locking mechanism of FIG. 1 showing upper and lower sets of cam locking brakes in the closed or locked position.

The operation of wave power harnessing apparatus 20 incorporating the cam brake locking mechanism 10 can best be understood by reference to FIGS. 2 and 3. FIG. 2 is a schematic illustration of the cam brake locking mechanism 10 of FIG. 1 showing upper and lower sets of locking cam brakes, wherein the lower set is shown rotated 90 degrees to be pictorially in the same plane as the upper set of locking cam brakes and offset downwardly to avoid overlap in the positioning of the cams for the purposes of illustration. In the preferred embodiment, each locking cam 11 is pivotal about cam pivot journal 16. FIG. 3 shows one cam 11 in the open or unlocked position and the position shown is analogously representative of all cams 11.

Buoyant body 35 is affixedly attached to drive shaft 14 and in response to the rising and falling level of the water causes reciprocal motion to be imparted to the drive shaft 14 with respect to mounting plate 13. Mounting plate 13 is affixedly attached to wave power harnessing apparatus 20. For purposes of illustration, one complete cycle of the apparatus will be described assuming a starting point where the buoyant body 35 is in a lower position and the two pairs of locking cams 11 are in a locking position as shown in FIG. 2. With electrical solenoids 19 not energized, return spring 17 urges the shaft engaging surface 28 of each lower locking cam 11 into frictional contact with reciprocable drive shaft 14. As the water level rises with respect to buoyant body 35, frictional forces are generated between the drive shaft 14 and the locking cams 11 along the lines indicated by 33. The relative forces due to friction, tend to rotate each lower locking cam 11 about its respective cam pivot journal 16 in the directions indicated by arrows 36 and each upper locking cam 11 about its respective cam pivot journal 16 in the directions indicated by arrows 37. Although the directions of rotation 37 of upper cam pair 41 are such as tend to cause cams 11 of upper cam pair 41 to rotate away from shaft 14, the directions of rotation 36 of lower cam pair 42 are such as tend to urge cams 11 of lower cam pair 42 into increased frictional contact with reciprocable drive shaft 14. Thus, the gripping force on the drive shaft becomes a function of the tension applied by return spring 17 and the coefficient of friction of shaft engaging surface 28. As long as the frictional forces 33 on lower cam pair 42 exceed the lift provided by buoyant body 35, reciprocable drive shaft 14 will remain in its lower position. When the wave has reached a predetermined higher level, a control system causes the electrical solenoids 19 to be energized, causing a force in the directions indicated by 32 to be applied to pull arm 18, pulling locking cams 11 apart and allowing the buoyant body 35 to translate reciprocable drive shaft 14 upwardly. When buoyant body 35 has reached a predetermined upper level, electrical solenoids 19 are de-energized and upper cam pair 41 locks reciprocable drive shaft 14 at an upper position.

Similarly, with electrical solenoids 19 not energized, return spring 17 urges shaft engaging surface 28 of each upper cam 11 into frictional contact with the reciprocable drive shaft 14. As the water level falls with respect to buoyant body 35, frictional forces are generated between the drive shaft 14 and the locking cams 11 along the lines indicated by 34. The relative forces due to the friction, tend to rotate each upper locking cam 11 about its respective cam pivot journal 16 in the directions indicated by arrows 38 and each lower locking cam 11 about its respective cam pivot journal 16 in the directions indicated by arrows 39. Although the direction of rotation 39 of lower cam pair 42 is such that it tends to cause the cams to rotate away from the shaft, the direction of rotation 38 of cams 11 of upper cam pair 41 is such as tends to urge upper cam pair 41 into increased frictional contact with reciprocable drive shaft 14. Thus, the gripping force on drive shaft 14 again becomes a function of the tension applied by return spring 17 and the coefficient of friction of shaft engaging surface 28. As long as frictional forces 34 on the upper cams exceed the downward forces acting on buoyant body 35, reciprocable drive shaft 14 will remain in its upper position. When the wave has reached a predetermined lower level, the control system again causes the electrical solenoids 19 to be energized, pulling locking cams 11 apart and allowing buoyant body 35 to translate reciprocable drive shaft 14 downwardly. When buoyant body 35 has reached a predetermined lower level, electrical solenoids 19 are de-energized and lower cam pair 42 again locks drive shaft 14 at the lower position, completing one full cycle of the apparatus.

Many obvious modifications in the details and arrangement of parts may be made, however, without departing from the true spirit and scope of the invention, as more particularly defined in the appended claims.

What is claimed is:

1. In a wave energy conversion apparatus of the type having a drive shaft reciprocable by means of a buoyant body, a cam brake locking mechanism, comprising:

(a) a supporting bracket affixedly mounted on said sea wave conversion apparatus said bracket adjacent said reciprocable drive shaft;

(b) a locking cam having a shaft engaging surface suitable for frictionally contacting said reciprocable drive shaft, said locking cam pivotally mounted on said supporting bracket and oriented to contact said reciprocable drive shaft with said shaft engaging surface;

(c) a spring adapted to urge said shaft engaging surface into frictional contact with said reciprocable drive shaft preventing relative motion of said reciprocable drive shaft in a singular direction within said sea wave energy conversion apparatus; and, (d) an electrical solenoid pivotally linked with said locking cam; whereby, when said electrical solenoid is energized, said locking cam is disengaged from frictional contact with said reciprocable drive shaft allowing said drive shaft to freely move within said sea wave energy conversion apparatus.

2. In a wave energy conversion apparatus of the type having a drive shaft reciprocable by means of a buoyant body, a cam brake locking mechanism, comprising:

(a) a supporting bracket affixedly mounted on said sea wave energy conversion apparatus, said bracket adjacent said reciprocable drive shaft;

(b) a plurality of locking cams each said locking cam having a shaft engaging surface suitable for frictionally contacting said reciprocable drive shaft, each said locking cam pivotally mounted on said supporting bracket and oriented to contact said reciprocable drive shaft with said shaft engaging surface;

(c) a spring adapted to urge said shaft engaging surface into frictional contact with said reciprocable drive shaft preventing relative motion of said reciprocable drive shaft in both directions within said sea wave energy conversion apparatus; and, (d) an electrical solenoid pivotally linked with said locking cam;

whereby, when said electrical solenoid is energized, said locking cam is disengaged from frictional contact with said reciprocable drive shaft allowing said drive shaft to move within said sea wave energy conversion apparatus.

3. A cam brake locking mechanism for a wave energy conversion apparatus as claimed in claim 2 wherein each said locking cam further comprises a series of grooves cut in the shaft engaging surface of said locking cam, said grooves being generally orthogonal to the direction of travel of said reciprocable shaft when said reciprocable shaft is normally operating within said sea wave energy conversion apparatus.

4. A cam brake locking mechanism for a wave energy conversion apparatus as claimed in claim 3 wherein each said series of grooves of each said locking cam is uniformly coated with a resilient material for enhancing the frictional characteristics of said locking cam.

5. In a wave energy conversion apparatus of the type having a drive shaft reciprocable by means of a buoyant body, a cam brake locking mechanism, comprising:

(a) a supporting bracket affixedly mounted on said sea wave energy conversion apparatus, said bracket adjacent said reciprocable drive shaft;

(b) a plurality of locking cams each said locking cam having a shaft engaging surface suitable for frictionally contacting said reciprocable drive shaft, each said locking cam pivotally mounted on said supporting bracket and oriented to contact said reciprocable drive shaft with said shaft engaging surface, said cam rotationally disposed about a cam pivot journal in such a manner that for at least a portion of one direction of translation of said reciprocable drive shaft, frictional contact between said shaft engaging surface and said reciprocable shaft tends to urge said cam into increased frictional contact with said reciprocable drive shaft;

(c) a spring adapted to urge said shaft engaging surface into frictional contact with said reciprocable drive shaft preventing relative motion of said reciprocable drive shaft in both directions within said sea wave energy conversion apparatus; and, (d) an electrical solenoid pivotally linked with said locking cam;

whereby, when said electrical solenoid is energized, said locking cam is disengaged from frictional contact with said reciprocable drive shaft allowing said drive shaft to move within said sea wave energy conversion apparatus.

6. A cam brake locking mechanism for a wave energy conversion apparatus as claimed in claim 5 wherein each said locking cam further comprises a series of grooves cut in the shaft engaging surface of said locking cam, said grooves being generally orthogonal to the direction of travel of said reciprocable shaft when said reciprocable shaft is normally operating within said sea wave energy conversion apparatus.

7. A cam brake locking mechanism for a wave energy conversion apparatus as claimed in claim 6 wherein each said series of grooves of each said locking cam is uniformly coated with a resilient material for enhancing the frictional characteristics of said locking cam.

* * * * *